Patented May 13, 1930

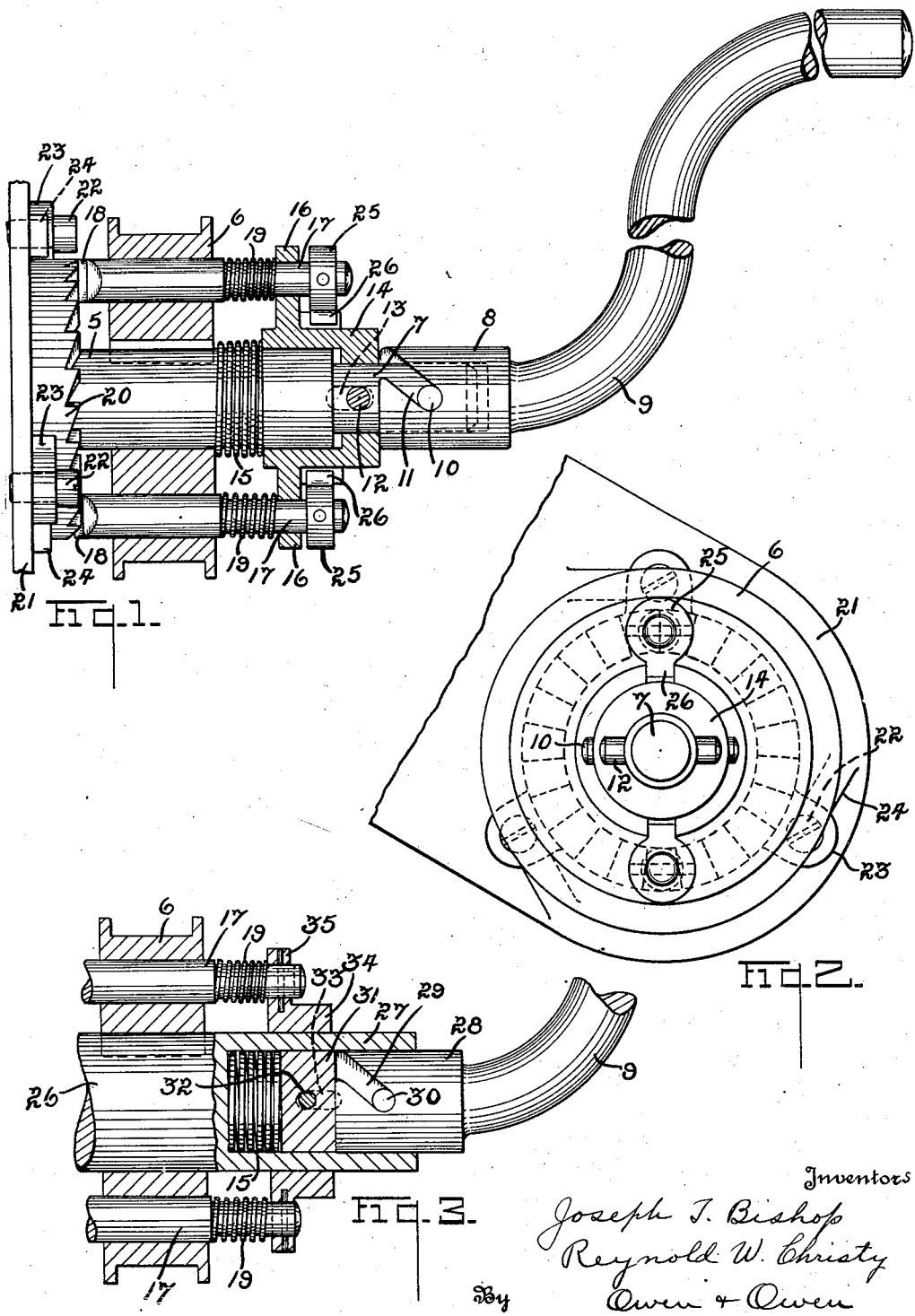

1,758,138

UNITED STATES PATENT OFFICE

JOSEPH T. BISHOP AND REYNOLD W. CHRISTY, OF TOLEDO, OHIO

CRANKING DEVICE

Application filed January 14, 1929. Serial No. 332,335.

This invention relates to a manually operable cranking device for internal combustion engines, including novel and improved means for positively preventing personal injury from back-firing.

The general object of the invention is to provide a check which will prevent the crank shaft from rotating backwardly when the crank is in operable position, yet will offer no appreciable resistance to the forward rotation of the shaft and will be automatically shifted to an idle position when the crank is withdrawn. A number of devices have heretofore been devised for throwing the crank out of its engagement with the crank shaft, in case of back-firing, but such devices are more or less violent in their action and sometimes cause considerable delay and vexation in again inserting the crank in position. In our construction, however, it is impossible for backfiring to cause an appreciable backward throw of the crank shaft or to impart any movement or shock to the hand crank.

With the above object in view, the invention comprises a ratchet device which, by the insertion of the hand crank in operative position and the forward rotation thereof, is rendered operative between the crank shaft and a fixed part of the engine block or its supporting frame, but is automatically released as soon as the hand crank is withdrawn.

The construction and operation of the invention will be more particularly explained in connection with the accompanying drawings, in which Figure 1 is a longitudinal sectional view illustrating the invention in position for operation, with the hand crank applied thereto.

Figure 2 is a front elevation of the same with the hand crank removed.

Figure 3 is a view similar to Figure 1, but showing a different adaptation of the invention.

The invention is illustrated in connection with the forwardly projecting end of a crank shaft 5, on which is secured a fan belt pulley 6. The shaft 5 terminates in a reduced portion 7 which is adapted to be received in a socket 8 formed on the inner end of a hand crank 9. A pin 10 projects radially from the end portion 7 of the crank shaft and is adapted to enter slots 11 in the socket 8, said slots being inclined so that a forward rotation of the crank will throw the socket farther on to the crank shaft by reason of the cam action of the pin 10 against the sides of the slots.

In rear of the pin 10 and spaced therefrom is another pin 12 disposed transversely to the crank shaft and engaging slots 13 formed in a sleeve 14 which is slidably mounted on the reduced portion 7 of the crank shaft. The sleeve 14 is constantly urged toward the front end of the crank shaft by a coil spring 15 which surrounds the shaft between the sleeve 14 and the pulley 6. The sleeve 14 is formed with oppositely disposed flanges 16 in which dogs 17 are slidably mounted. Each of these dogs terminates at its rear end in a tooth 18 and the dog is urged rearwardly by a coil spring 19, so that when the sleeve 14 is forced rearwardly, the tooth 18 normally engages one of the ratchet teeth formed on a ratchet member 20. This ratchet member is secured to the engine block or bed 21 by some suitable means such as screws 22 which pass through lugs 23 formed on the periphery of the ratchet member. In the present instance, the supporting member 21 is formed with shoulders 24 which prevent the screws 22 from being sheared or distorted by any backward pressure exerted upon the ratchet member 20.

The dogs 17 are slidable in the pulley 6 as well as the flanges 16, but are held against rotation on their own axes by collars 25 which are secured to the front portions of the respective dogs and are formed with lugs 26 slidably engaging suitable ways formed on the sleeve 14.

It will be seen, therefore, that when the crank 9 is applied to the reduced end portion 7 of the crank shaft and rotated, it wll be forced rearwardly and will also force the sleeve 14 rearwardly against the tension of the spring 15. The springs 19 will force the dogs 17 into engagement with the ratchet member 20. This ratchet member preferably has an odd number of teeth of equal size, so that when one dog is riding over a tooth, the opposite dog will be in engagement. When the crank 9 is rotated, therefore, to crank the engine, the dogs 17 will ride freely over the teeth of the ratchet member 20, and one of the dogs will always be in engagement so that if back-firing occurs, one of the dogs will always be in position to positively prevent any backward rotation of the crank shaft. Consequently there will be no appreciable backward throw of the hand crank 9 and there will also be no tendency to throw the hand crank out of its engagement with the shaft. As soon as the engine begins to fire properly, however, the crank shaft will rotate faster than the hand crank and the engagement of the pin 10 against the opposite edges of the slots 11 will disengage the hand crank from the shaft. At the same time, the sleeve 14 is released and is permitted to move forwardly under the action of the spring 15 until the pin 12 is engaged by the rear ends of the slots 13. This forward movement of the sleeve 14 will cause the flanges 16 to engage the collars 25 and will positively withdraw the dogs 17 from their active position.

In the modification illustrated in Figure 3, the invention is adapted to operate in connection with a crank shaft 26 having a socket 27 at its front end which receives the corresponding end 28 formed on the hand crank 9. This end 28 is formed with a spiral slot 29 adapted to receive a pin 30 which extends across the socket portion 27 of the crank shaft. A block 31 is slidably mounted in the socket 27 and is urged forwardly by the spring 15 which in this instance is seated in the bottom of the socket. A pin 32 extends through the block 31 and through slots 33 formed in the socket member 27, the outer ends of the pin 32 being secured in a sleeve 34 which encompasses the socket portion 27 and is slidable longitudinally thereof as far as is permitted by the slots 33. The sleeve 34 is formed with flanges 35 adapted to slidably receive the front portions of the dogs 17 which are keyed to the sleeve so that their action will be controlled thereby in the same manner as in Figure 1.

From the foregoing description, it will be seen that we have provided a very simple and practical construction, which is adapted to be used in connection with any type of crank shaft. It will also be understood that the principles of the invention may be embodied in constructions which differ considerably from those herein shown. It is our intention, therefore, to include all such modifications within the scope of the appended claims.

What we claim is:

1. The combination with an engine shaft, of a member held for rotation therewith, but having a limited longitudinal slidable movement thereon, a relatively fixed ratchet member, spring held dogs connected with said slidable member and engageable with the ratchet member to positively prevent backward rotation of the engine shaft, means to crank the engine and at the same time shift the slidable member to bring the dogs into operative relation to the ratchet member, means rendered operable by the engine shaft, as soon as the engine is started, to withdraw the slidable member to its initial position, and means on said slidable member to positively withdraw the dogs to inoperative position as said slidable member is withdrawn.

2. The combination with an engine shaft, of a member held for rotation with said shaft but having a limited longitudinal slidable movement thereon, a hand crank for starting the engine, means, rendered operative by the operation of the hand crank, to advance said slidable member toward the engine, ratchet means, rendered operative by such advance of the slidable member, to positively prevent backward rotation of the engine shaft, a spring for withdrawing the slidable member, as soon as the engine starts, and means actuated by such withdrawal to render the ratchet means inoperative.

3. The combination with an engine shaft and a fan belt pulley secured thereto, of a ratchet member fixed with relation to the engine block, spring held dogs slidably mounted in said pulley for engagement with said ratchet member to prevent backward rotation of the engine shaft, a member mounted for rotation with the engine shaft and having a limited longitudinal sliding movement thereon, means to crank the engine and at the same time shift the slidable member to bring the dogs into operative relation to the ratchet member, means rendered operable by the engine shaft as soon as the engine is started, to withdraw the slidable member to its initial position, and means on said slidable member to positively withdraw the dogs to inoperative position as said slidable member is withdrawn.

4. The combination with an engine shaft, of a member slidable thereon and held for rotation therewith, a series of relatively fixed ratchet teeth, a hand crank normally detached, means for operatively connecting said crank to the engine shaft and at the same time shifting said slidable member, and dogs, actuated by the shifting of said member, to engage said ratchet teeth to prevent reverse rotation of the engine shaft.

5. The combination with an engine shaft and a fan belt pulley secured thereto, of a ratchet member fixed with relation to the engine block, dogs slidably mounted in said pulley for engagement with said ratchet member to prevent backward rotation of the engine shaft, a normally detached hand crank capable of direct engagement with the shaft for starting the engine, and means for rendering said dogs operative only when said hand crank is so engaged.

In testimony whereof we have hereunto signed our names to this specification.

JOSEPH T. BISHOP.
REYNOLD W. CHRISTY.